(12) United States Patent
Srivastava et al.

(10) Patent No.: US 7,990,040 B2
(45) Date of Patent: Aug. 2, 2011

(54) PHOSPHOR FOR HIGH CRI LAMPS

(75) Inventors: Alok Srivastava, Niskayuna, NY (US);
Holly Comanzo, Niskayuna, NY (US);
Venkatesan Manivannan, Fort Collins, CO (US)

(73) Assignee: General Electric Company, Schenectady, NY (US)

( * ) Notice: Subject to any disclaimer, the term of this patent is extended or adjusted under 35 U.S.C. 154(b) by 596 days.

(21) Appl. No.: 12/136,967

(22) Filed: Jun. 11, 2008

(65) Prior Publication Data

US 2009/0309482 A1    Dec. 17, 2009

(51) Int. Cl.
*H01J 1/62* (2006.01)
*H01J 63/04* (2006.01)
*C09K 11/06* (2006.01)

(52) U.S. Cl. ........ 313/487; 313/483; 313/484; 313/485; 313/486; 252/500; 252/519.3; 252/301.16

(58) Field of Classification Search .......... None
See application file for complete search history.

(56) References Cited

U.S. PATENT DOCUMENTS

| | | |
|---|---|---|
| 5,602,444 A | 2/1997 | Jansma |
| 6,525,460 B1 | 2/2003 | Soules et al. |
| 6,528,938 B1 | 3/2003 | Jansma |
| 6,669,866 B1 | 12/2003 | Kummer et al. |
| 6,841,939 B2 | 1/2005 | Scott et al. |
| 6,867,536 B2 | 3/2005 | Srivastava et al. |
| 6,952,081 B1 | 10/2005 | Jansma et al. |
| 6,992,432 B1 | 1/2006 | Jansma |
| 7,026,755 B2 | 4/2006 | Setlur et al. |
| 7,138,757 B2 | 11/2006 | Toth et al. |
| 7,221,084 B2 | 5/2007 | Fan et al. |

*Primary Examiner* — Natalie K Walford
(74) *Attorney, Agent, or Firm* — Pearne & Gordon LLP

(57) ABSTRACT

A fluorescent lamp including a phosphor layer including $(Y_{1-x-y}Gd_x)AlO_3:EU^{3+}{}_y$, wherein $0.4 \leq x \leq 0.7$ and $0 \leq y \leq 0.1$, and at least one of each of a green and blue emitting phosphor. The resulting lamp will exhibit a white light having a color rendering index of preferably 90 or higher with a correlated color temperature of from 2500 to 10000 Kelvin. The use of $(Y_{1-x-y}Gd_x)AlO_3:Eu^{3+}{}_y$ in phosphor blends of lamps results in high CRI light sources with increased stability and acceptable lumen maintenance over, the course of the lamp life.

20 Claims, 4 Drawing Sheets

PHOSPHOR FOR HIGH CRI LAMPS

FIELD OF THE INVENTION

The present invention relates to a lamp, and more particularly to a fluorescent lamp having a phosphor layer comprising a red-emitting phosphor having a peak emission in the deep red region.

DESCRIPTION OF RELATED ART

The present invention relates generally to fluorescent lamps and more particularly to fluorescent lamps with high color-rendering-index (CRI) or $R_a$ values and high lumen outputs. Color rendition is a measure of the light reflected by a color sample under a given light source, compared to the light reflected by the same sample under a standard light source. Lumen output is a measure of the perceived power of light, taking into account the varying sensitivity of the human eye to different wavelengths of light. Fluorescent lamps with high CRI values and high lumen outputs are desirable in many applications.

Fluorescent lamps may be designed to achieve high color rendition based on use of phosphor blends that "fill in" the visible spectrum, i.e. provide emission at substantially all wavelengths across the visible spectrum, and may be designed to achieve high lumen output based in part on use of phosphors that do not emit excessively or broadly in the deep red region where eye sensitivity is low. High CRI fluorescent lamps using known red phosphors, such as $Y_2O_3:Eu^{3+}$, which emits maximally at 611 nm, have been described, but such lamps emit poorly in the deep red range. Other phosphors emitting in the deep red region are less preferred for high CRI lamps because such phosphors exhibit broadband emission in the red region and lower lumen output, rather than more desirable peak line emission in the red region, preferably above 611 nm, and higher lumen output. Other phosphors emitting in the red region may be used but may be suboptimal regarding lamp stability and maintenance, manufacturing, and the environment. Thus, a need remains for fluorescent lamps using a red phosphor having a line emission above 611 nm, wherein the lamps exhibit high CRI values and high lumen outputs.

SUMMARY OF THE INVENTION

A lamp, such as a mercury vapor discharge lamp, can comprise a light-transmissive envelope having an inner surface, a discharge-sustaining fill comprising inert gas sealed inside the envelope, and a phosphor layer inside the envelope and adjacent the inner surface of the envelope. Optionally, the lamp can have a barrier layer between the envelope and phosphor layer. The phosphor layer can comprise a blue phosphor emitting at about 440 to 500 nm, a green phosphor emitting at about 500 to 600 nm, and a red phosphor emitting at about 610 to 640 nm with a peak emission greater than 611 nm. The red phosphor can have the general formula of $(Y_{1-x-y}Gd_x)AlO_3:Eu^{3+}{}_y$, wherein $0.4 \leq x \leq 0.7$ and $0 \leq y \leq 0.1$. Preferably, the lamp emits visible light wherein the visible light has a color rendering index of greater than 88 at a correlated color temperature of between about 2500 and 10000 K.

A phosphor blend suitable for use in a lamp, the phosphor blend comprising a red phosphor having the general formula of $(Y_{1-x-y}Gd_x)AlO_3:Eu^{3+}{}_y$, wherein $0.4 \leq x \leq 0.7$ and $0 \leq y \leq 0.1$, wherein the red phosphor has a peak emission greater than 611 nm. The red phosphor is preferably about 30 to 60 percent by weight of the phosphor blend. The phosphor blend can further comprise a green phosphor emitting at about 500 to 600 nm, wherein the green phosphor can be about 20 to 40 percent by weight of the phosphor blend. The phosphor blend can further comprise a blue phosphor emitting at about 440 to 500 nm, wherein the blue phosphor can be about 10 to 30 percent by weight of the phosphor blend.

A lamp comprising a light-transmissive envelope having an inner surface, and a phosphor layer inside said envelope and adjacent the inner surface of the envelope. The phosphor layer comprising a red phosphor having the general formula of $(Y_{1-x-y}Gd_x)AlO_3:Eu^{3+}{}_y$, wherein $0.4 \leq x \leq 0.7$ and $0 \leq y \leq 0.1$. The red phosphor preferably emitting at about 610 to 640 nm with a peak emission greater than 611 nm.

DETAILED DESCRIPTION OF THE PREFERRED EMBODIMENTS OF THE INVENTION

In the description that follows, when a preferred range, such as 5 to 25 (or 5-25), is given, this means preferably at least 5 and, separately and independently, preferably not more than 25. As used herein, a "fluorescent lamp" is any mercury vapor discharge fluorescent lamp as known in the art, including fluorescent lamps having electrodes, and electrodeless fluorescent lamps where the means for providing a discharge include a radio transmitter adapted to excite mercury vapor atoms via transmission of an electromagnetic signal.

Figure 1:
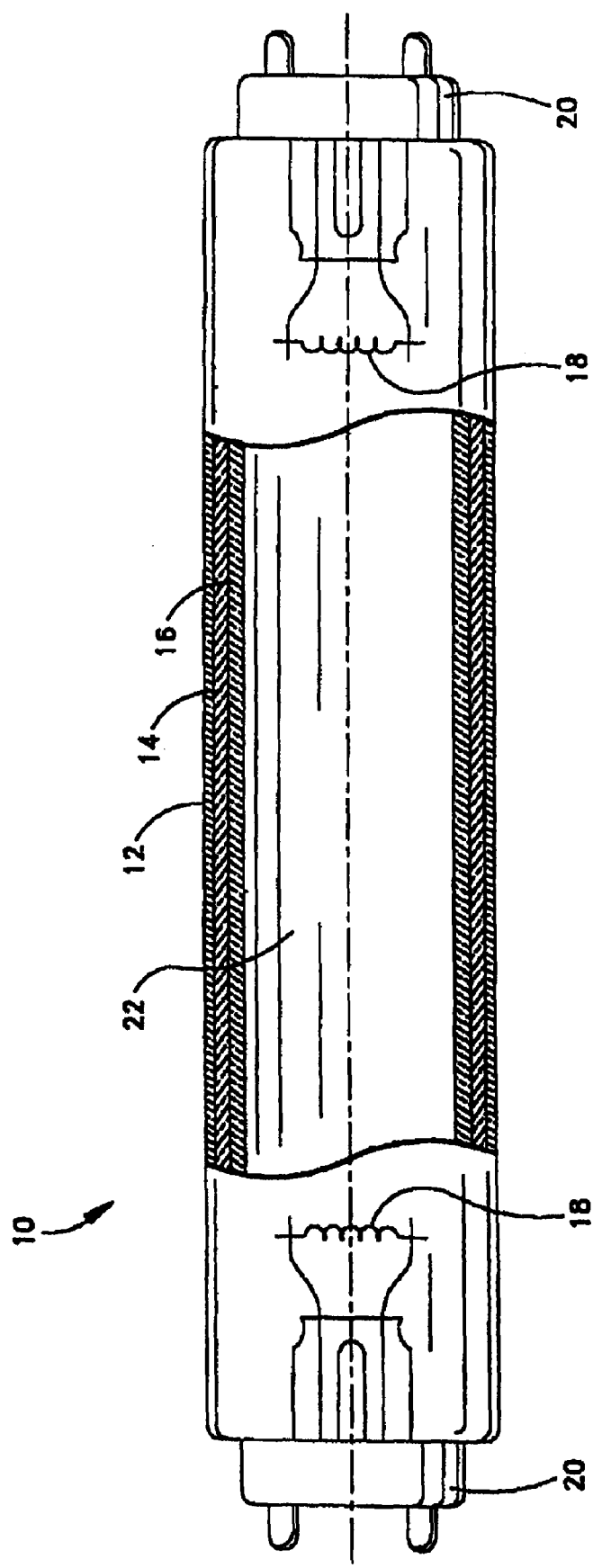
FIG. 1 shows diagrammatically, and partially in section, a lamp in accordance with one embodiment of the present invention.

With reference to FIG. 1, there is shown a low pressure mercury vapor discharge lamp 10 according to the invention, which is generally well known in the art. The lamp 10 has a light-transmissive, preferably linear and cylindrical, glass tube or envelope 12 that preferably has a circular cross section.

Figure 2:
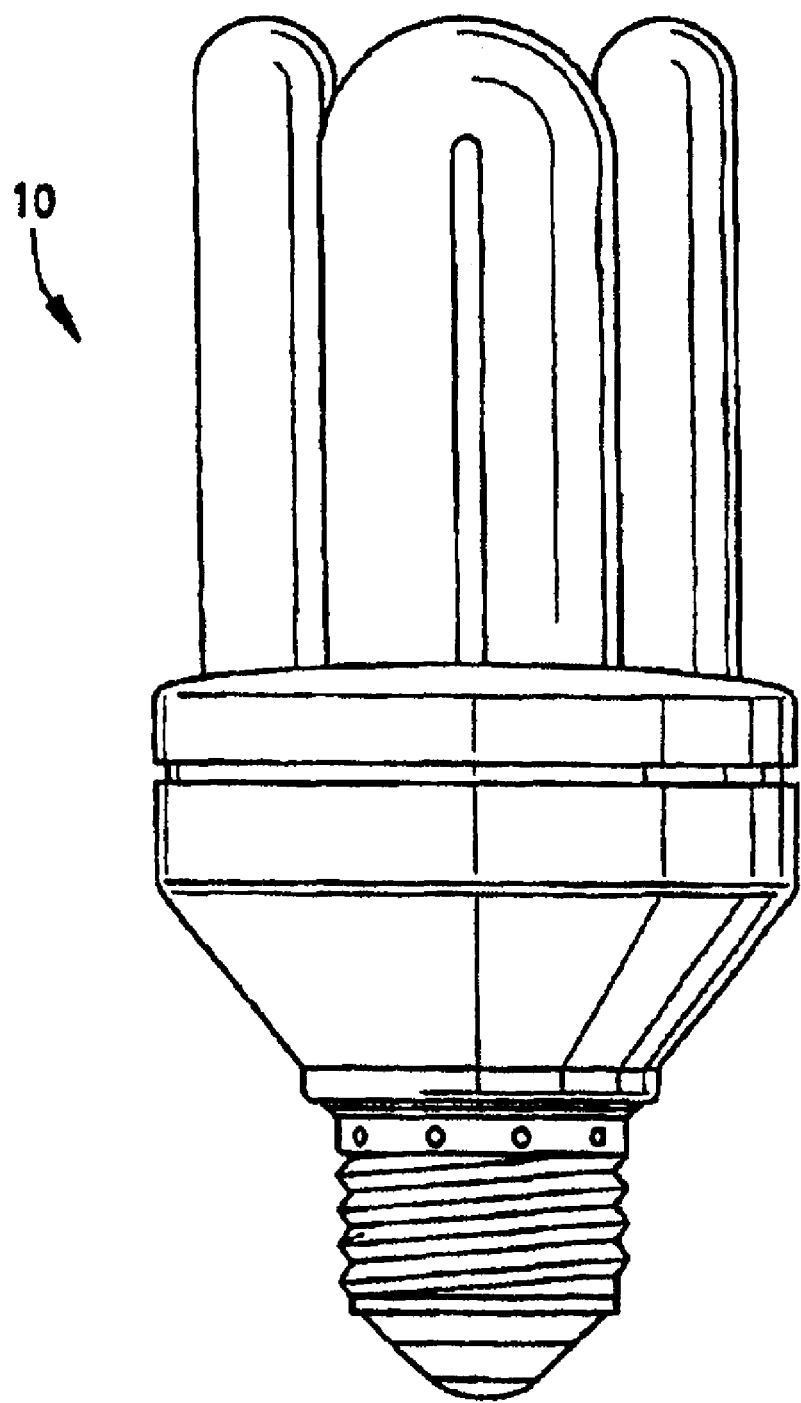
FIG. 2 shows a compact fluorescent lamp in accordance with one embodiment of the present invention.

Lamp 10 can be a fluorescent lamp, such as a T12, T10 or T8 lamp, which is generally known in the art, nominally 48 inches or 4 feet in length, a cylindrical tube, and having a nominal outer diameter of at least 1 inch or an outer diameter of 1 inch or about 1 inch. The lamp 10 can also be nominally 1.5, 2, 3, 5, 6 or 8 feet long. Alternatively, the lamp 10 can be nonlinear, for example circular or otherwise curvilinear in shape, or have a nominal outer diameter less than one inch such as a T5, T4 or T3 lamp having nominal outer diameters of about 0.625 (⅝) inch, 0.5 (½) inch and 0.375 (⅜) inch, respectively. In this alternative case, as shown in FIG. 2, the lamp 10 can also be nominally 1.5, 2, 3, 4, 5, 6 or 8 feet long, or it may be a compact fluorescent lamp (CFL) having a spiral, multi-finger, folded or wrapped topology so that the overall length of the lamp is much shorter than the unfolded length of the glass tube. As shown in FIG. 2, a compact fluorescent lamp having a fluorescent tube, a housing closed by a cap and a screw base is seen in side view. A compact fluorescent lamp can be connected electrically to the mains through the base known in the art, and wires coming from the connection portions of the base are connected to a ballast circuit arranged inside the housing and/or to electrodes of the fluorescent tube.

Turning back to FIG. 1, the lamp 10 is hermetically sealed by bases 20 attached at both ends and electrodes or electrode structures 18 (to provide an arc discharge) are respectively mounted on the bases 20. A discharge-sustaining fill 22 is provided inside the sealed glass envelope, the fill comprising or being an inert gas or inert gas mixture at a low pressure in combination with a small quantity of mercury to provide the low vapor pressure manner of lamp operation.

The inert gas in the fill comprises at least one rare gas such as, but not limited to, argon, krypton, xenon and neon or combinations thereof. The total pressure of the fill 22 (including mercury vapor and inert gas) is preferably 0.4-5, preferably 1-3, preferably 1.6-2.8, torr at the conventional fill temperature as known in the art, for example 25° C.

The inner surface of the envelope 12 is preferably provided with a barrier coating or layer 14 for improved light softness and/or brightness maintenance with age. The inner surface of the barrier layer 14 is preferably provided with a phosphor layer 16, the barrier layer 14 being between the envelope 12 and the phosphor layer 16. Phosphor layer 16 is preferably a rare earth phosphor layer, such as a rare earth triphosphor or multi-phosphor layer, or other phosphor layer.

The general coating structure is preferably as taught in U.S. Pat. No. 5,602,444, the contents of which are incorporated herein by reference in its entirety. This coating structure is known in the art. The barrier layer 14 can be silica or yttrium oxide as know in the art, or more preferably alumina as also known in the art. For example, as disclosed in the '444 patent, the barrier layer 14 can comprise a blend of gamma- and alpha-alumina particles. In another example, the barrier layer 14 can comprise 5-80 or 10-65 or 20-40 weight percent gamma alumina and 20-95 or 35-90 or 60-80 weight percent alpha alumina.

The phosphor layer 16 can be coated on the inner surface of the envelope 12, and preferably the barrier layer 14, and preferably has a coating weight of 1-5 or 2-4 mg/cm$^2$ or other conventional coating weight. In a coating procedure, various phosphor powders can be blended by weight. The resulting powder is then dispersed in a water vehicle (which may contain other additives as are known in the art, including adherence promoters such as fine non-luminescent particles of alumina or calcium pyrophosphate) having, optionally, a dispersing agent as is known in the art. A thickener may be added, for example, polyethylene oxide. The suspension can then be diluted with water, preferably deionized, until it is suitable for producing a coating of the desired thickness or coating weight, as described above. In a two-coat configuration utilizing two phosphor layers, a base coat, such as a halophosphate base coat, is first applied to the inside of the envelope 12 or barrier layer 14. The phosphor blend suspension is then applied as a coating to the inside of the envelope 12 and heated by forced air until dry, as is known in the art. After the first thin coat or layer is applied, additionally desired thin coats or layers may be applied in the same manner, carefully drying each coat before the next coat is applied. Thin layers can be built up until the total or cumulative coating thickness is sufficient to absorb substantially all of the UV light produced by the arc in the lamp 10. Although not intended to be limiting, the thickness of the phosphor layer 16 can be between about 1 and 25 microns, depending on the exact composition of the phosphor blend of the phosphor layer 16 and the particle size of the phosphors used in the blend.

The phosphor layer 16 preferably comprises a mixture of red-, green- and blue-emitting rare earth phosphors, preferably as a three- or four-phosphor blend. Rare earth phosphor blends comprising other numbers of rare earth phosphors, such as blends with 5 rare earth phosphors or more, can alternatively be used in the phosphor layer 16. As is known in the art, the phosphor layer 16 can optionally contain finely divided alumina as an adherence additive, preferably the alumina is present in less than 1 or less than 2 weight percent (based on the total weight of phosphor layer 16). Otherwise, the phosphor layer 16 does not contain, and is substantially free from the presence of, barrier layer material such as the alumina used in barrier layer 14, since this is unnecessary due to the presence of barrier layer 14. Additional additives may be included in the phosphor layer 16 and can include, for example, a dispersion vehicle, binder and one or more of various known non-luminescent additives, including, e.g., calcium phosphate, thickeners, dispersing agents, and certain borate compounds as are known in the art.

As described herein, the phosphor layer 16 preferably contains an improved red phosphor having the general formula $(Y_{1-x-y}Gd_x)AlO_3:Eu^{3+}_y$, wherein $0.4 \leq x \leq 0.7$ and $0 \leq y \leq 0.1$ and preferably $0.55 \leq x \leq 0.65$ or $x=0.6$ and $0.05 \leq y \leq 0.08$ or $y=0.06$, in a blend with other phosphors, such as a mixture of one or two blue phosphors and one or two green phosphors, such that the total phosphor blend of the phosphor layer 16 yields high color rendition values for the Average Color Rendition Index ($R_a$) or CRI. For example, the improved red-emitting $(Y_{1-x-y}Gd_x)AlO_3:Eu^{3+}_y$ phosphor can be $(Y_{0.34}Gd_{0.6})AlO_3:Eu^{3+}_{0.06}$, which has a peak emission greater than 611 nm, and at about 614 to 616 nm. As will be seen below, the improved red-emitting $(Y_{1-x-y}Gd_x)AlO_3:EU^{3+}_y$ phosphor is an improvement over the known red phosphors often used in fluorescent lamps, for example, $Y_2O_3:Eu^{3+}$, which has a peak emission in the red region at about 611 nm.

The improved red-emitting $(Y_{1-x-y}Gd_x)AlO_3:EU^{3+}_y$ phosphor can be blended with any conventional known phosphors to produce a phosphor blend of the present invention capable of emitting white light. Other phosphors of the phosphor layer 16 can include, but are not limited to, $LaPO_4$:Ce, Tb (LAP); $GdMgB_5O_{10}$:Ce, Tb (CBT); $CeMgAl_{11}O_{19}$ (CAT); $Sr_5(PO_4)_3$(Cl, F, OH):$Eu^{2+}$ (SECA); $BaMgAl_{10}O_{17}$:$Eu^{2+}$ (BAM), $BaMgAl_{10}O_{17}$:$Eu^{2+}$, $Mn^{2+}$ (BAM/BaMn); $Ca_5(PO4)_3$(Cl, F, OH):$Sb^{3+}$, $Mn^{2+}$, $Eu^{2+}$ (HALO) and $Sr_4Al_{14}O_{25}$:$Eu^{2+}$ (SAE) or combinations thereof and the like. For example, the improved red-emitting $(Y_{1-x-y}Gd_x)AlO_3$:$Eu^{3+}_y$ phosphor can be blended with one or more of each of a blue phosphor emitting at about 440 to 500 nm and a peak emission at about 450 to 456 nm or 490 to 500 nm, and a green phosphor emitting at about 500 to 600 nm and a peak emission at about 535 to 555 nm or about 545 nm. Non-limiting examples of green-emitting phosphors include rare earth activated phosphors such as Tb—Ce activated magnesium aluminate, yttrium silicate and lanthanum orthophosphate, such as $LaPO_4$:Ce, Tb (peak emission at about 545 nm); $CeMgAl_{11}O_{19}$; $GdMgB_5O_{10}$:Ce, Tb and $BaMgAl_{10}O_{17}$:$Eu^{2+}$, $Mn^{2+}$ (peak emission at about 515 nm). Non-limiting examples of blue-emitting phosphors include europium activated barium magnesium aluminate, strontium chlorophosphate, or strontium barium calcium chlorophosphate, such as $Sr_4Al_{14}O_{25}$:$Eu^{2+}$ (peak emission at about 495 nm); $Ca_5(PO4)_3$(Cl, F, OH):$Sb^{3+}$, $Mn^{2+}$, $Eu^{2+}$; $BaMgAl_{10}O_{17}$:$Eu^{2+}$ (peak emission at about 455 nm) and $Sr_5(PO_4)_3$(Cl, F, OH):$Eu^{2+}$ (peak emission at about 445 nm). A preferred phosphor blend comprises a mixture of SAE, LAP, BAM and $(Y_{1-x-y}$ $Gd_x)AlO^3:EU^{3+}_y$ phosphor, wherein $0.4 \leq x \leq 0.7$ and $0 \leq y \leq 0.1$, such as $(Y_{0.34}Gd_{0.6})AlO_3:EU^{3+}_{0.06}$.

To provide the preferred phosphor layer 16, sufficient $(Y_{1-x-y}Gd_x)AlO_3:EU^{3+}_y$ phosphor is added to a mixture of rare earth phosphors to provide a fluorescent lamp 10 having or exhibiting a CRI or $R_a$ value of greater than 80, preferably 82, preferably 84, preferably 86, preferably 88 or preferably 90 or more. Although not intended to be limiting, the phosphor blend of the phosphor layer 16 can comprise about 10 to 30, preferably 15 to 25 or preferably about 20, 21 or 22 percent by weight of a blue phosphor, about 30 to 60, preferably 40 to 50 or preferably about 44, 45 or 46 percent of a red phosphor, and about 20 to 40, preferably 25 to 35 or preferably about 31, 32 or 33 percent of a green phosphor. In one embodiment, the red phosphor can be $(Y_{0.34}Gd_{0.6})AlO_3:Eu^{3+}_{0.06}$.

The relative proportions of the individual phosphors in the phosphor blend may be adjusted such that when their emissions are blended, there is produced visible light of predetermined x and y values of CIE coordinates. Preferably the combinations of the phosphors or phosphor blends in the phosphor layer 16 result in a predetermined color point where the x value is in the range of about 0.3 to about 0.40, preferably about 0.35 to 0.4 or about 0.38 and the y value is within about 0.3 to about 0.40, preferably about 0.35 to 0.4 or about 0.38, as measured on the Planckian locus. Preferably the phosphor blends have substantially uniform and predetermined brightness and CRI, as discussed above. Preferably the brightness is greater than 65, preferably 70 or about 71 or 72 Lms/W, and the CRI is greater than about 88 and preferably 90. The proportions of the phosphor components are adjusted to obtain the high brightness and CRI throughout the desirable color point range so that so that lamps have uniformly high brightness and color point. In addition, the resulting lamps will have a correlated color temperature (CCT) of 2500-10000, more preferably 4500-2500 K, depending on the relative amounts of the various phosphors used.

Figure 3:
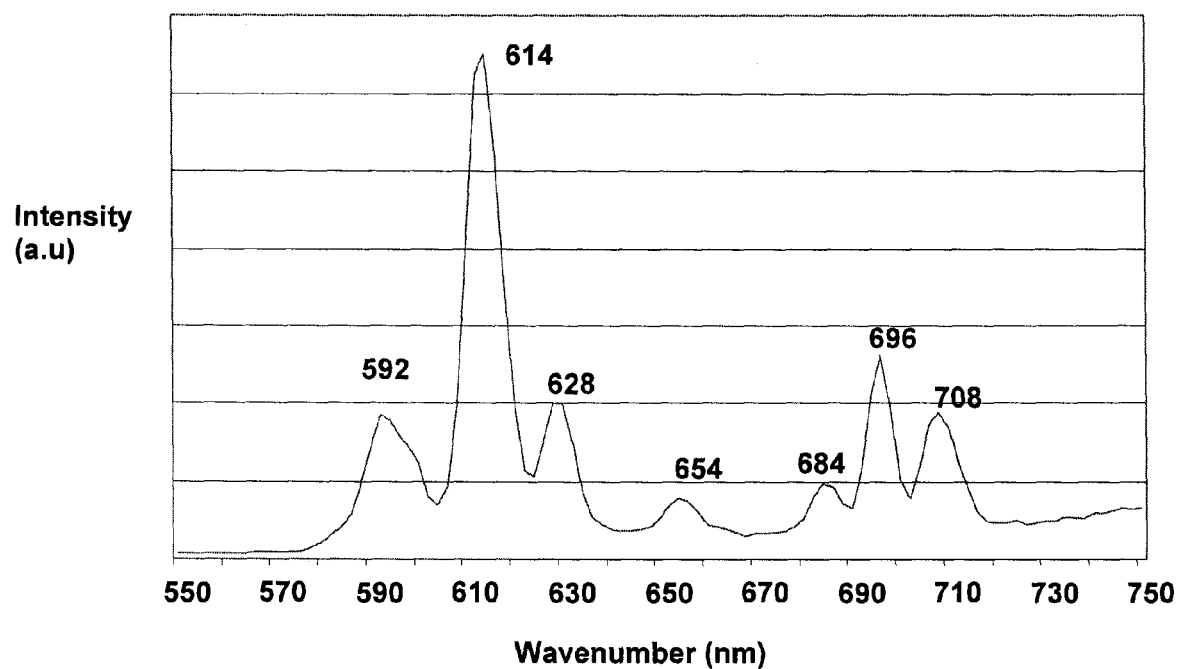
FIG. 3 shows an emission spectrum of a red-emitting phosphor in accordance with one embodiment of the present invention.

In one embodiment, the phosphor layer 16 preferably comprises a phosphor having a peak emission in the orange-red region, for example, a $(Y_{1-x-y}Gd_x)AlO_3:EU^{3+}_y$ phosphor. An example emission spectrum of a $(Y_{1-x-y}Gd_x)AlO_3:EU^{3+}_y$ phosphor having a strong emission peak in the red region with a desirable reduced intensity in orange and deep red regions is shown in FIG. 3. A lamp having an improved color rendering index would advantageously include an emission spectrum having a peak line emission, either single or multiple peaks, rather than a broad emission, in the orange and red regions. Preferably, the peak line emission of the $(Y_{1-x-y}Gd_x)AlO_3:Eu^{3+}_y$ phosphor in the orange-red region is greater than 611 nm, preferably 612 nm, preferably 613 nm, preferably 614 nm, preferably 615 nm and more preferably 616 nm. The $(Y_{1-x-y}Gd_x)AlO_3:EU^{3+}_y$ phosphor preferably has a higher peak line emission wavelength than current phosphors emitting in the orange-red region, such as $Y_2O_3:Eu^{3+}$ having a peak emission at about 611 nm. As shown, the phosphor of FIG. 3 emits an emission spectrum with a narrow red line or peak, which reduces or minimizes line emissions in regions where eye sensitivity is low.

The emission spectrum of FIG. 3 is for a phosphor having the formula $(Y_{0.34}Gd_{0.6})AlO_3:Eu^{3+}_{0.06}$. As shown, the $(Y_{0.34}Gd_{0.6})AlO_3:Eu^{3+}_{0.06}$ phosphor has a peak emission in the orange-red region at about 614 nm, corresponding to 5Do-7F$^2$ direct transition of Eu$^{3+}$, and two weak sub emissions at 592 nm and 696 nm, corresponding to 5Do-7F$^1$ and 5Do-7F$^4$, respectively. The use of $(Y_{0.34}Gd_{0.6})AlO_3:Eu^{3+}_{0.06}$, which has its main emission at about 614 nm, allows for production of higher CRI light sources, such as a fluorescent lamp, than those made using $GdAlO_3:Eu^{3+}$, $YVO_4:Eu^{3+}$ or $Y_2O_2S:Eu^{3+}$, which have lamp stability and maintenance limitations, as well as manufacturing and environmental concerns.

The $(Y_{1-x-y}Gd_x)AlO_3:EU^{3+}_y$ phosphor may be made by any ceramic powder method, such as a liquid phase (flux) method or a solid state method. In one embodiment, a $(Y_{1-x-y}Gd_x)AlO_3:EU^{3+}_y$ phosphor can be prepared by using a precursor blend or mixture of oxides of yttrium, gadolinium and europium. The blend of oxides of yttrium, gadolinium and europium can be synthesized through an oxalate decomposition synthesis. The blend of oxides is combined with barium borate and boric acid to form a sample mixture. The barium borate and boric acid serve as fluxes. Preferably, the sample mixture is fired at about 3-8 hours at 1300 to 1500° C., preferably at 1400° C. in air for about 5 hours. The fired material is crushed and/or milled as conventional in the art to obtain a sample having an average particle size in the range of 2 to 6, and preferably about 4 microns. The sample can be run through a mesh or screen to ensure a desired particle size or to remove any agglomerates of particles. The fired mixture is then coated onto the substrate, such as a lamp bulb or envelope as described above. Preferably, a suspension of the mixture particles and/or a liquid is used to coat the substrate, such as an envelope.

In order to promote a further understanding of the invention, the following examples are provided. These examples are shown by way of illustration and not limitation.

EXAMPLE 100 grams of $(Y_{0.34}Gd_{0.6})AlO_3:Eu^{3+}_{0.06}$ phosphor was prepared.

An oxide precursor was first prepared. 220 grams of the $(Y_{0.34}Gd_{0.6}Eu_{0.06})_2O_3$ precursor was prepared by an oxalate decomposition consisting of heating and stirring 53.55 grams of yttrium oxide, 151.72 grams of gadolinium oxide and 14.73 grams of europium oxide in 1500 milliliters of a 50:50 solution of nitric acid and water until the oxides were dissolved. The solution was removed from heat and allowed to cool to ambient temperature over a period of time. The solution was further diluted with 3500 milliliters of water. Ammonium hydroxide (NH$_4$OH) can be used to adjust the pH upward if the solution is acidic. 273 grams of oxalic acid was added to the cooled solution and the solution was continuously stirred for one hour. The solution was filtered, washed with water and dried. The dried oxalate precursor was decomposed by heating the dry sample at 1000° C. for two hours in air to obtain 220 grams of $(Y_{0.34}Gd_{0.6}Eu_{0.06})_2O_3$ oxide precursor.

The $(Y_{0.34}Gd_{0.6})AlO_3:Eu^{3+}_{0.06}$ phosphor was prepared by blending the following components: 75.57 grams of the $(Y_{0.34}Gd_{0.6}Eu_{0.06})_2O_3$ oxide precursor described above, 24.43 grams of aluminum oxide, 0.042 grams of barium carbonate and 0.104 grams of boric acid. The blend was fired at 1400° C. in air for 5 hours to yield $(Y_{0.34}Gd_{0.6})AlO_3:Eu^{3+}_{0.06}$. The sintered blend was then crushed and milled to obtain a mixture having an average particle size of about 4 microns.

Figure 4:
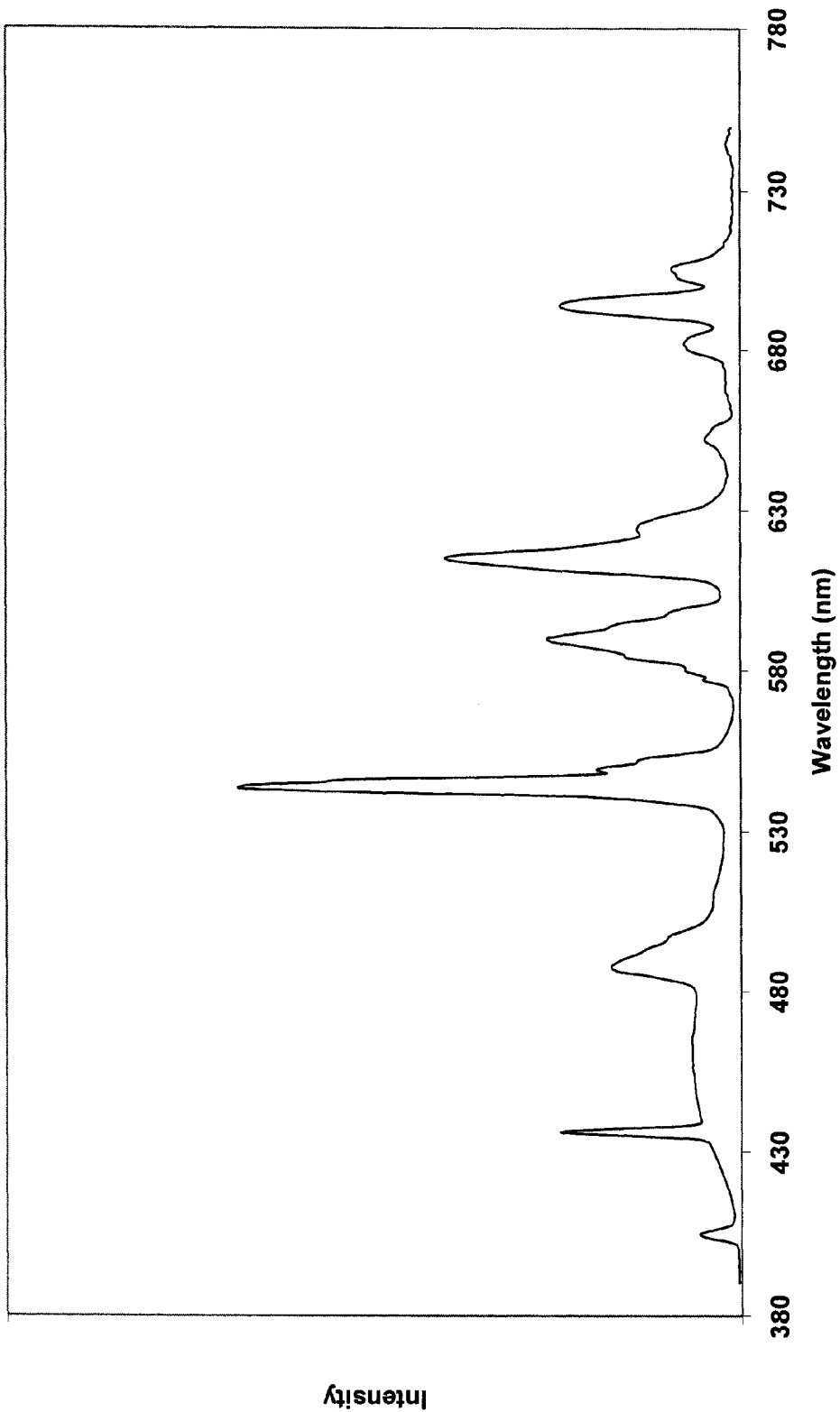
FIG. 4 shows a simulated emission spectrum of a red-emitting phosphor in a blend of phosphors in accordance with one embodiment of the present invention.

In order to illustrate the emission spectrum of a lamp having a phosphor layer containing the $(Y_{1-x-y}Gd_x)AlO_3:EU^{3+}_y$ phosphor in a blend with other phosphors, an emission spectrum of such a lamp was simulated and is shown in FIG. 4. The emission spectrum of FIG. 4 is approximates the spectrum for the following concentration of phosphors of a phosphor blend: LAP at about 0.33 weight percent, BAM at about 0.10 weight percent, SAE at about 0.11 weight percent and $(Y_{0.34}Gd_{0.6})AlO_3:Eu^{3+}_{0.06}$ at about 0.46 weight percent. It was further approximated that a lamp having a phosphor layer having this phosphor blend would exhibit a CCT of about 4000 K, provide about 2328 lumens at a CRI of 90 with a luminous efficacy of 71.9 Lms/W. Luminous efficacy of a source of light is the quotient of the total luminous flux emitted by the total lamp power input as expressed in lumens per watt (LPW or 1 m/W). The color coordinates on the CIE scale of a fluorescent lamp utilizing this phosphor blend were estimated to be x=0.38, y=0.38.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

What is claimed is:

1. A mercury vapor discharge lamp comprising a light-transmissive envelope having an inner surface, a discharge-sustaining fill comprising inert gas sealed inside said envelope, and a phosphor layer inside said envelope and adjacent the inner surface of said envelope, said phosphor layer comprising a blue phosphor emitting at about 440 to 500 nm, a green phosphor emitting at about 500 to 600 nm, and a red phosphor emitting at about 610 to 640 nm with a peak emission greater than 611 nm, said red phosphor being a phosphor having the general formula of $(Y_{1-x-y}Gd_x)AlO_3:EU^{3+}_y$, wherein $0.4 \leq x \leq 0.7$ and $0 \leq y \leq 0.1$.

2. The lamp of claim 1, said lamp further comprising a barrier layer between said envelope and said phosphor layer.

3. The lamp of claim 1, said lamp having a CRI value of 88 or greater at a correlated color temperature of from 2500 to 10000 K.

4. The lamp of claim 1, said phosphor layer of said lamp emitting visible light having color coordinates on the CIE scale wherein x value is in the range of 0.3 to 0.4 and y is in the range of 0.3 to 0.4.

5. The lamp of claim 4, said x value is in the range of 0.35 to 0.4 and said y value is in the range of 0.35 to 0.4.

6. The lamp of claim 4, said visible light having color coordinates on the CIE scale wherein x value is 0.38 and y is 0.38.

7. The lamp of claim 1, said lamp being a compact fluorescent lamp.

8. The lamp of claim 1, said red phosphor having a peak emission greater than 613 nm.

9. The lamp of claim 1, said red phosphor being a phosphor having the general formula of $(Y_{1-x-y}Gd_x)AlO_3:Eu^{3+}_y$, wherein $0.55 \leq x \leq 0.65$ and $0.05 \leq y \leq 0.08$.

10. The lamp of claim 1, said red phosphor having the formula $(Y_{0.34}Gd_{0.6})AlO_3:EU^{3+}_{0.06}$.

11. The lamp of claim 1, said phosphor layer comprises about 10 to 30 percent by weight of said blue phosphor, about 20 to 40 percent by weight of said green phosphor and about 30 to 60 percent by weight of said red phosphor.

12. The lamp of claim 1, said green phosphor being selected from the group consisting of $LaPO_4:Ce:Tb$ (LAP); $GdMgB_5O_{10}:Ce:Tb$ (CBT); $CeMgAl_{11}O_{19}$ (CAT); and $BaMgAl_{10}O_{17}:Eu^{2+}:Mn^{2+}$ (BaMn).

13. The lamp of claim 1, said green phosphor being selected from the group consisting of $Sr_5(PO_4)_3(Cl, F, OH):Eu^{2+}$ (SECA); $BaMgAl_{10}O_{17}:Eu^{2+}$ (BAM); $Ca_5(PO_4)_3(Cl, F, OH):Sb^{3+}:Mn^{2+}:Eu^{2+}$ (HALO); and $Sr_4Al_{14}O_{25}:Eu^{2+}$ (SAE).

14. The lamp of claim 1, said phosphor layer comprising a blend of $(Y_{0.34}Gd_{0.6})AlO_3:Eu^{3+}_{0.06}$; $LaPO_4:Ce:Tb$ (LAP); $Sr_4Al_{14}O_{25}:Eu^{2+}$ (SAE) and $BaMgAl_{10}O_{17}:Eu^{2+}$ (BAM).

15. A phosphor blend suitable for use in a lamp, said phosphor blend comprising a red phosphor having the general formula of $(Y_{1-x-y}Gd_x)AlO_3:EU^{3+}_y$, wherein $0.4 \leq x \leq 0.7$ and $0 \leq y \leq 0.1$, said red phosphor having a peak emission greater than 611 nm and said red phosphor being about 30 to 60 percent by weight of said phosphor blend, a green phosphor emitting at about 500 to 600 nm, said green phosphor being about 20 to 40 percent by weight of said phosphor blend, and a blue phosphor emitting at about 440 to 500 nm, said blue phosphor being about 10 to 30 percent by weight of said phosphor blend.

16. The phosphor blend of claim 15, said red phosphor being a phosphor having the general formula of $(Y_{1-x-y}Gd_x)AlO_3:EU^{3+}_y$, wherein $0.55 \leq x \leq 0.65$ and $0.05 \leq y \leq 0.08$.

17. The phosphor blend of claim 15, said red phosphor having the formula $(Y_{0.34}Gd_{0.6})AlO_3:EU^{3+}_{0.06}$.

18. The phosphor blend of claim 15, said phosphor blend being suitable for use in a lamp emitting visible light having a CRI value of 88 or greater at a correlated color temperature of from 2500 to 10000 K.

19. A lamp comprising a light-transmissive envelope having an inner surface, and a phosphor layer inside said envelope and adjacent the inner surface of said envelope, said phosphor layer comprising a red phosphor having the general formula of $(Y_{1-x-y}Gd_x)AlO_3:EU^{3+}_y$, wherein $0.4 \leq x \leq 0.7$ and $0 \leq y \leq 0.1$, said red phosphor emitting at about 610 to 640 nm with a peak emission greater than 611 nm.

20. The lamp of claim 19, said lamp exhibits a correlated color temperature of between about 2500 and 10000 K and a color rendering index of greater than 88.

* * * * *